(12) United States Patent
Pirwani et al.

(10) Patent No.: US 8,928,698 B2
(45) Date of Patent: Jan. 6, 2015

(54) COMPRESSION OF ROAD FEATURES IN MAP TILES

(71) Applicant: Apple Inc., Cupertino, CA (US)

(72) Inventors: Imran A. Pirwani, Campbell, CA (US); Pinaki Sinha, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/706,011

(22) Filed: Dec. 5, 2012

(65) Prior Publication Data

US 2013/0328937 A1    Dec. 12, 2013

Related U.S. Application Data

(60) Provisional application No. 61/657,827, filed on Jun. 10, 2012.

(51) Int. Cl.
| | |
|---|---|
| *G09G 5/00* | (2006.01) |
| *G06F 13/12* | (2006.01) |
| *G06F 13/38* | (2006.01) |
| *G06F 3/048* | (2013.01) |
| *G09G 5/373* | (2006.01) |
| *G01C 21/32* | (2006.01) |
| *G01C 21/36* | (2006.01) |
| *G06F 3/14* | (2006.01) |

(52) U.S. Cl.
CPC ............... *G09G 5/373* (2013.01); *G01C 21/32* (2013.01); *G01C 21/367* (2013.01); *G06F 3/14* (2013.01); *G09G 2340/045* (2013.01); *G09G 2360/122* (2013.01); *G09G 2370/022* (2013.01)
USPC ............... 345/660; 701/400; 710/65; 710/68; 715/788

(58) Field of Classification Search
None
See application file for complete search history.

(56) References Cited

U.S. PATENT DOCUMENTS

| | | | |
|---|---|---|---|
| 7,672,778 B1 * | 3/2010 | Elliott ........................... | 701/417 |
| 8,243,102 B1 * | 8/2012 | Cornell ......................... | 345/660 |
| 8,274,524 B1 * | 9/2012 | Cornell et al. ................ | 345/581 |
| 8,560,600 B2 * | 10/2013 | Maurer et al. ................ | 709/203 |
| 2003/0231190 A1 * | 12/2003 | Jawerth et al. ................ | 345/660 |
| 2007/0244632 A1 * | 10/2007 | Mueller et al. ................ | 701/202 |
| 2008/0270576 A1 * | 10/2008 | Cummings .................... | 709/219 |
| 2012/0078493 A1 * | 3/2012 | Schunder et al. ............. | 701/117 |
| 2012/0254804 A1 * | 10/2012 | Sheha et al. ................... | 715/834 |
| 2012/0303264 A1 * | 11/2012 | Su et al. ........................ | 701/416 |
| 2013/0147846 A1 * | 6/2013 | Kalai et al. .................... | 345/660 |

* cited by examiner

*Primary Examiner* — Maurice L McDowell, Jr.
*Assistant Examiner* — Donna J Ricks
(74) *Attorney, Agent, or Firm* — Kilpatrick Townsend & Stockton LLP; David B. Raczkowski

(57) ABSTRACT

Road information is compressed for map tiles of a map containing a network of roads. The map can have different sets of tiles for each zoom level. For a given zoom level, road segments can be grouped based on the class of the roads (e.g., interstate highway, state highway, divided highway, side street, etc.). The road segments of a particular class can be combined into paths, and a representative segment can be chosen for each path. The features of the representative segment can be used in displaying the corresponding path, thereby reducing the size used to store the path in a map tile. This reduce-size map tile can be transmitted more efficiently due to the smaller size.

27 Claims, 9 Drawing Sheets

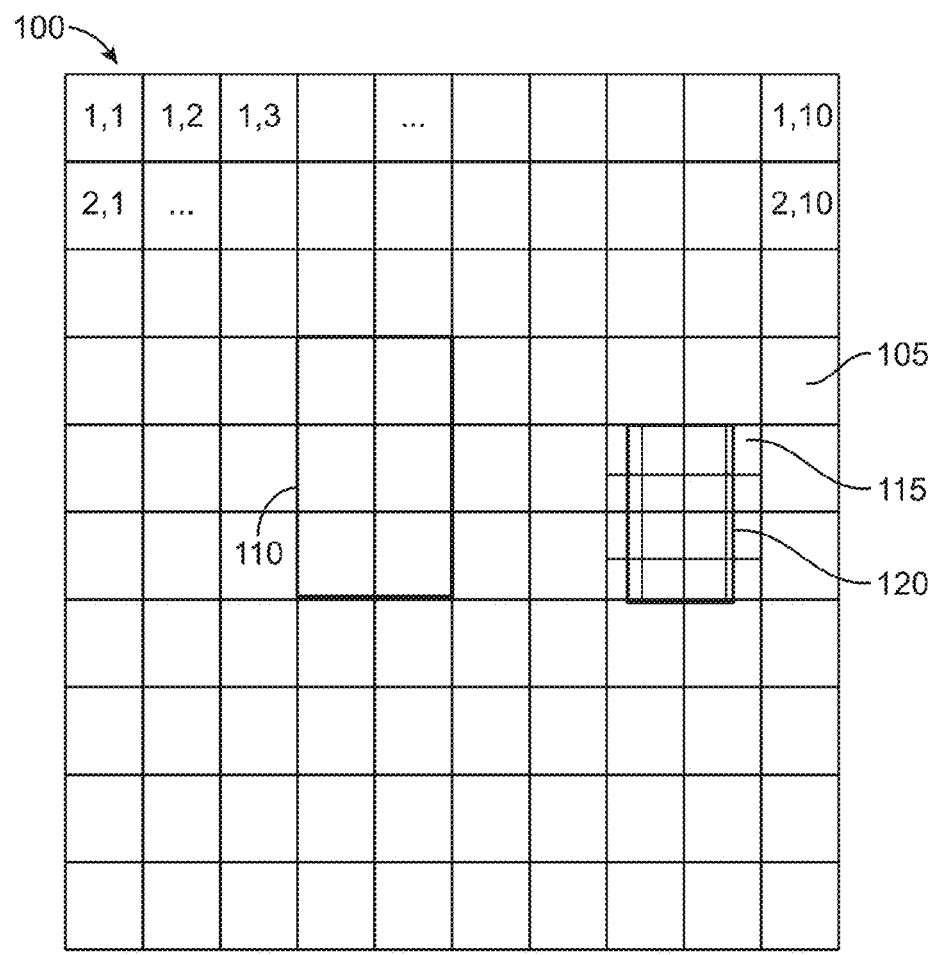
FIG. 1A
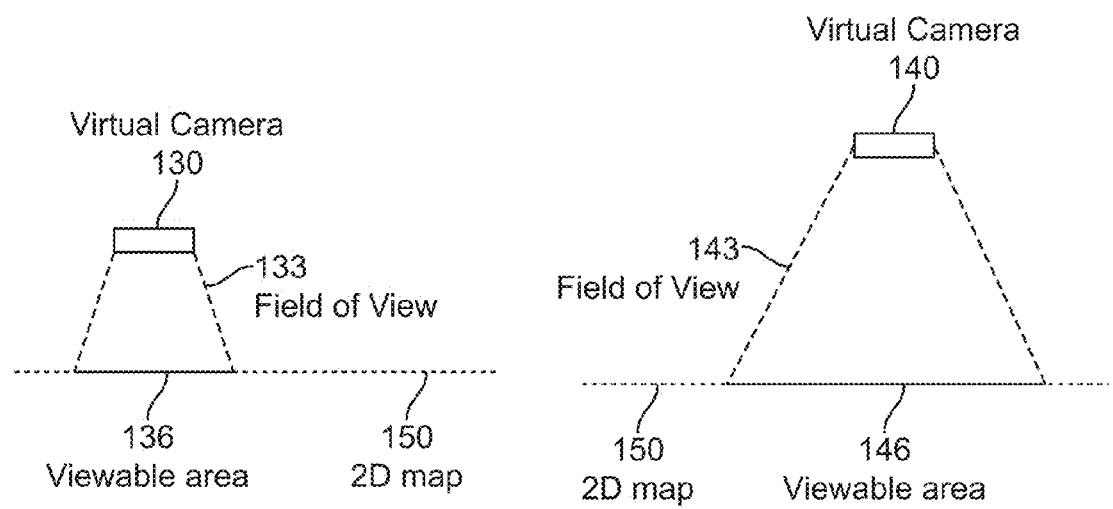
FIG. 1B
FIG. 1C

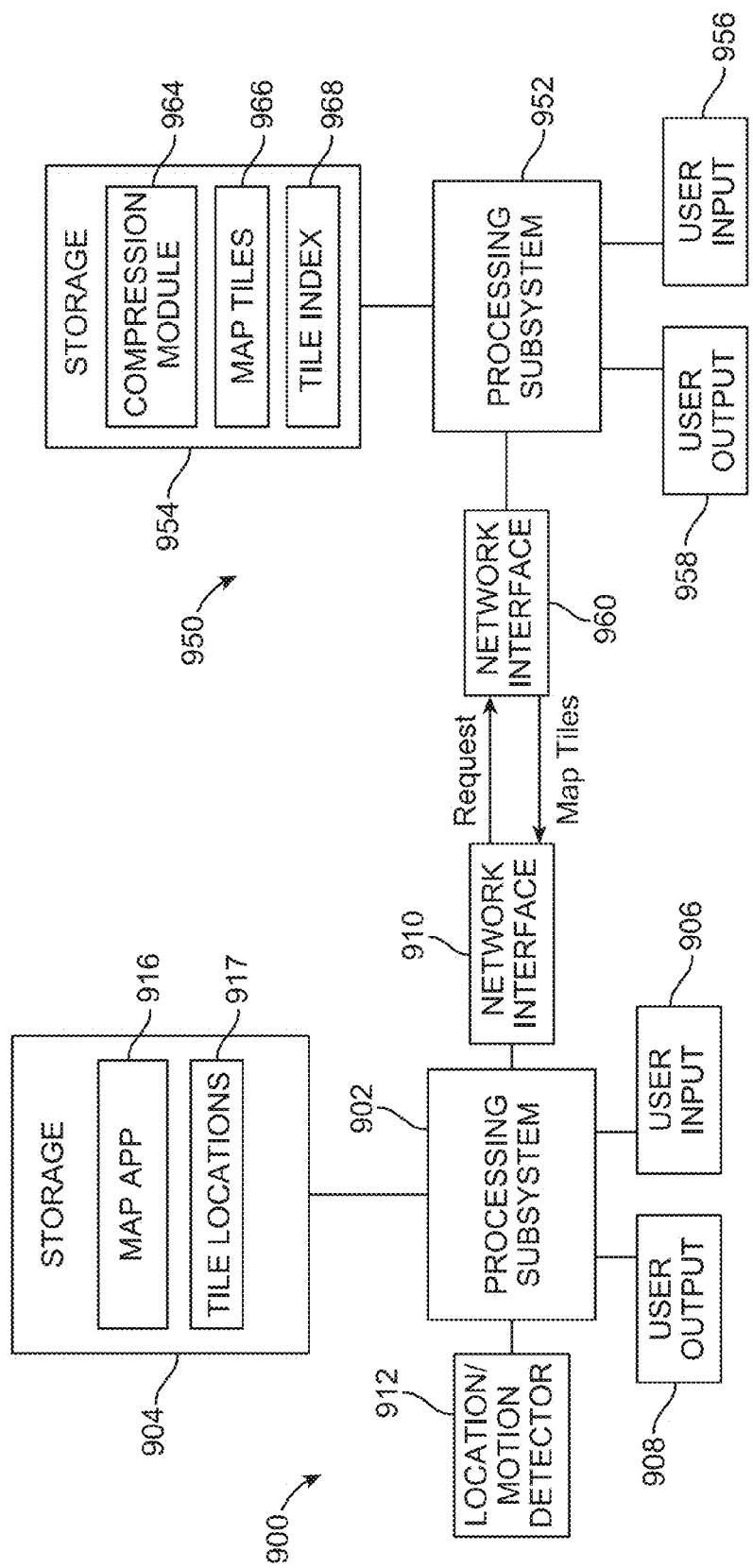

COMPRESSION OF ROAD FEATURES IN MAP TILES

CROSS-REFERENCE TO RELATED APPLICATIONS

The present application claims priority from and is a non-provisional application of U.S. Provisional Application No. 61/657,827, entitled "COMPRESSION OF ROAD FEATURES IN MAP TILES" filed Jun. 10, 2012, the entire contents of which are herein incorporated by reference for all purposes.

BACKGROUND

The present disclosure is generally related to creating map tiles for viewing in a map application of a mobile device, and more specifically to compressing road features based on a zoom level of the map.

Many mobile devices (e.g., a smartphone) have a map application that allows a user to view different geographical areas for certain purposes, such as to navigate roads in a certain area, to find out traffic conditions on certain roads, or to find locations of certain stores. A user navigates within the map application to see different areas to zoom out or zoom in to see the map at different resolutions. A user may navigate the map in various ways, such as by using a touch screen. Typically, the mobile device does not already store the map, but instead requests map tiles from a server. The requested map tiles would correspond to the geographic area that the user has selected.

The retrieval of the map tiles by the mobile device is typically limited by bandwidth (e.g., a radio communications connection relative to a Wi-Fi connection) or cost, as data plans often limit the number of bytes of data. Map tiles at a lower zoom (e.g., a virtual camera is farther from the map) will cover more geographic area, but typically store less information per square distance than a map tile at a higher zoom (e.g., a virtual camera is closer to the map). If the virtual camera is very far away or very close, the data size of the map tiles are often not too large. However, the map tiles at certain zoom levels can contain much road information, particularly when a road network of a city is being viewed using middle levels of zoom.

Therefore, it is desirable to provide methods and system for compressing road features into map tiles that are sent to devices for displaying a view of a road network.

BRIEF SUMMARY

Embodiments can provide systems and methods for compressing road information for map tiles of a map containing a network of roads. The map can have different sets of tiles for each zoom level. For a given zoom level, road segments can be grouped based on the class of the roads (e.g., interstate highway, state highway, divided highway, side street, etc.). The road segments of a particular class can be combined into paths, and a representative segment can be chosen for each path. At least one feature of the representative segment can be used in displaying the corresponding path, thereby reducing the size used to store the path in a map tile. In one aspect, this reduced-size map tile can be transmitted more efficiently due to the smaller size, and can do so without sacrificing discernible accuracy.

According to one embodiment, a method compresses road information for map tiles of a map containing a network of roads. Road information is received for each of a plurality of road segments of the road network. Each road segment has a classification and one or more additional road features. The plurality of road segments form a graph. A first zoom level of the map is selected. The map is composed of a plurality of first map tiles for the first zoom level. A computer system identifies a plurality of groups of road segments based on the classifications of the road segments. Each group of road segments forms a subgraph. For each of the groups, the computer system combines the road segments of the respective group to form one or more paths, where the number of paths is less than the number of road segments in the respective group. For each path, the computer system identifies a road segment in the path that is representative of the respective path, and uses the one or more additional road features of the identified road segment to define the respective path in one or more of the first map tiles containing the path.

Other embodiments are directed to systems, mobile devices, and computer readable media associated with methods described herein.

A better understanding of the nature and advantages of the present invention may be gained with reference to the following detailed description and the accompanying drawings.

BRIEF DESCRIPTION OF THE DRAWINGS

FIG. 1A shows a grid 100 corresponding to the map tiles of a two-dimensional (2D) map. FIG. 1B shows a side view of a virtual camera 130 at a first height above the 2D map 150, which contains the grid for indexing the map tiles. FIG. 1C shows a virtual camera 140 at a second larger height from 2D map 150.

FIG. 9A is a simplified block diagram of an implementation of a device 900 according to an embodiment of the present invention. FIG. 9B is a simplified block diagram of an implementation of map server 950 according to an embodiment of the present invention.

DEFINITIONS

Figure 2:
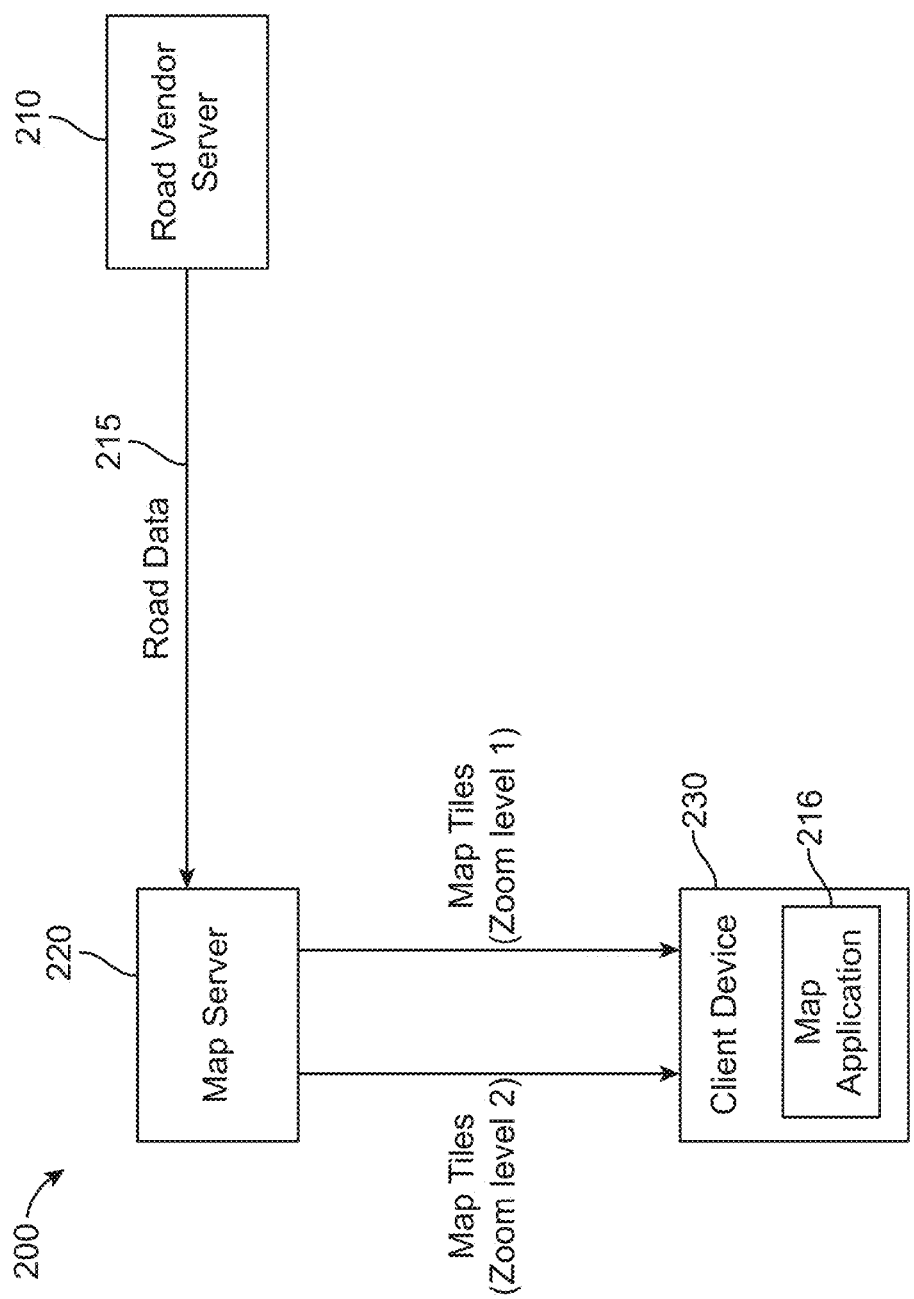
FIG. 2 shows a block diagram of a system 200 involved in providing views of a road network in a map application.

The term "road features" or "road attributes" refers to any information that a server may obtain regarding a road network. Examples include a road class, labels, speed limit, number of lanes, and other examples mentioned herein. Some of the features can be used by a device to display a road network on a map. The term "junction" refers to any point in a road that marks a beginning or an end of a road segment. Examples of junctions include an intersection, a grade separated crossing, an end of a road, or any point between road segments where the features of a road change, such as number of lanes or name. The term "road segment" is a part of a road between two junctions. For example, a road segment can be what is normally considered a road that is between intersections of the road with other roads, or between an intersection and an end of the road. However, there can be more than one road segment between intersections, as there may be junctions between intersections. Depending on the resolution being used, the intersection may be between roads of a similar classification or larger.

A class (also called classification) of a road segment pertains to the type of road, which can relate to the size of the road, where the road travels, and other factors. The classifications can form a hierarchy, where different classifications have a different level of importance. For example, road class 1 would be of greater importance than road class 6, which can impact whether a road is displayed or not at a particular zoom level. Roads of a same class can also share data, thereby providing compression. The term "path" refers to a sequence of contiguous road segments, which typically would be part of a same group or classification. Two road segments are contiguous when they share a junction.

DETAILED DESCRIPTION

When a user requests a view of a road network on a map, the data size of the map tiles downloaded may be large if the view contains a substantial number of roads. Downloading large map tiles can take a long time and use up a substantial portion of the bytes of a user's data plan. In such circumstances, the user typically does not need to see as detailed a collection of features as when a smaller number of roads are being viewed. Also, such detailed features do not need to be repeated or be perfectly accurate for all roads (e.g., the number of depicted lanes or name of a road). Accordingly, embodiments can compress the features stored in a map tile. Note that embodiments can be applied for map tiles at any zoom level.

In various embodiments, as part of the compression, unimportant roads (e.g., as determined by a classification) can be removed depending on the zoom level of the map. Road segments having a same classification (e.g., freeway, highway, boulevard, main thoroughfare, etc.) can be grouped together and then combined in a plurality of paths. Then, at least one feature of one representative road segment for a path can be used to define the entire path, thereby compressing the amount of data needed to define the path, and the underlying roads of the path. As noted herein, the path can be defined by different road features from different representative road segments, e.g., a path could be defined by a collection of road features where each feature in the collection is from a different representative road segment (thus each representative road segment could be representative of just one road feature, but also could be representative of more than one road feature). The locations (e.g., shape) of the paths can also be approximated based on the zoom level for the map tiles being created.

I. Retrieving Map Tiles from Map Server

As mentioned above, a mobile device (e.g., a smartphone) can execute a map application to allow a user to view different part of a two-dimensional (2D) map. For example, the user can change the part of the map displayed on a screen of the mobile device by swiping the screen to move the view. This movement of the view is a result of a movement of a virtual camera that defines what is being displayed. Once the map application identifies the new position of the virtual camera, the viewable part of the map can be identified and the map tiles of the viewable part of the map can be requested from a map server. To identify the required map tiles (also referred to as "tiles"), the mobile device can provide an index of the map tiles by referring to a grid that is shared by the mobile device and the map server.

FIG. 1A shows a grid 100 corresponding to the map tiles of a two-dimensional (2D) map. As shown, the map tiles are indexed by row and column, but other indexing (e.g., by sequential numbers) can be used. One position of the viewing area on a mobile device is shown as box 110. Bounding box 110 can be moved around to see different parts of the map. For example, a user can move the box in directions using a keypad, touch screen, or other suitable controls. As another example, the user could enter a search term corresponding to a particular location or select a current location, and a map application (or "app") can position the box over the selected area using default settings (e.g., default zoom settings).

The mobile device can store the indexed array 100 so that the device can identify which tiles are needed from a server. For example, at position 110, the device needs the map tiles (i.e. the graphic information of the map) corresponding to grid sections (4,4), (4,5), (5,4), (5,5), (6,4), and (6,5). Once the device identifies these grid sections, the device can request the corresponding map tiles from the map server. The grid section and tiles can be of any suitable shape. In one implementation, the grid can be defined by a latitude and longitude for the boxes.

As another example, if the user moves the view to a position of bounding box 120, the device would need grid sections (5,8), (5,9), (6,8), and (6,9). However, bounding box 120 is at a higher resolution, as signified by a smaller box for displaying on a screen of the device. With the higher resolution, a different set of map tiles may be used, i.e., corresponding to a finer grid. Map tiles 115 are shown with the finer grid. As with bounding box 120, only part of a tile may be displayed. Thus, any tile that is at least partially within the viewable area would be retrieved.

Accordingly, a bounding box (i.e. the size of the view) can be made larger or smaller, where there can be less resolution when the box is bigger. In one embodiment, when the map is made larger or smaller, a resolution setting is determined, and the device can then request the indices of a map at that particular resolution (e.g., corresponding to map tiles 115 as opposed to the larger map tiles 105). It is also possible that different maps may be used at different resolutions. For example, different resolutions would have different sets of map tiles. As examples, the server can determine which map tiles to provide based on a submitted resolution or the size of the box. The resolution can be determined by how far away a virtual camera is from a surface that defines the 2D map.

FIG. 1B shows a side view of a virtual camera 130 at a first height above the 2D map 150, which contains the grid for indexing the map tiles. The height can be referred to a Z-direction, with X,Y coordinates being the map coordinates of the 2D map. As shown, virtual camera 130 is viewing the map from directly above. At the first height, virtual camera 130 has a field of view 133 that intersects 2D map 150 to define the viewable area 136 of the map given the position of virtual camera 130. Field of view 133 is shown as two lines where the viewable area is within the two lines. The field of view can be defined in various ways, e.g., the perimeter of an expanding circle, or other geometric shape. The viewable area 136 can be of a different shape than the screen on which the image is displayed. The device can identify the parts of the viewable area that fall within the screen size, and just request those tiles.

FIG. 1C shows a virtual camera 140 at a second larger height from 2D map 150. Since virtual camera 140 is farther away from 2D map 150, a field of view 143 does not intersect 2D map 150 until later. Thus, viewable area 146 is larger. A user might select this position of virtual camera 140 by zooming out. As mentioned above, when a user zooms in or zoom out, the different resolution can use a different set of map tiles. In one implementation, some of the map tiles from one resolution can be used to render an image at a different resolution. For instance, map tiles at a finer resolution can be used to render views at a lower resolution (e.g., certain features can be removed as one zooms out). It also can be possible to add more information to map tiles at the lower resolution to obtain the finer resolution, thereby being able to re-use the map information already loaded at the lower resolution. In another implementation, the map tiles from one resolution are not re-used to rendering another image at another resolution.

The map tiles may store metadata associated with particular locations with the map tile, e.g., information about stores at particular locations and information about the stores. Different map tiles may be retrieved at various times. This can occur, for example, when a user is simply moving around the virtual camera for the purposes of, say, to look for a restaurant around where they live.

II. Road Network

A roadway network often contains diverse information like detailed description of the various road segments, the connections between the road segments, their geometries, etc. The term "road segment" is a part of a road between two junctions, which often corresponds to a part of a road that lies between two intersections of the road with other roads, which may be between roads of a same or different classification. A junction can exist between intersections though. A map server can receive the road features and create map tiles for providing to devices wanting to view part of the road network in a map application.

FIG. 2 shows a block diagram of a system 200 involved in providing views of a road network in a map application. A road vendor server 210 can store road data 215 (e.g., road features) for road segments of a road network in a database. The road data can be obtained in a variety of ways, e.g., from government sources or by tracking positions by vehicles traveling the roads. Regardless of the manner of initial collection, road data 215 is sent to a map server 220.

Map server 220 uses road data 215 to create map tiles that cover (span) certain geographical sections (e.g., grid sections as shown in FIG. 1). A certain amount of road data is included in each map tile corresponding to the road segments contained within that map tile. Embodiments can address which data is to be stored in a map tile, how much data, and how the data is organized (e.g., which data corresponds to which set of road segments, and which road segments share data to achieve compression). The map tiles are sent to client device 230, such as a mobile device (e.g., a smartphone), so that a user may use a map application 216 executing on a processor to move a virtual camera to view a part of the road network by retrieving the needed map tiles from map server 220.

Typically, the map can be organized in a hierarchical structure where each level in the hierarchy corresponds to a "zoom level," as described above. Each zoom level corresponds to a vertical distance from where an application or an end-user might be viewing the network (i.e. the height of the virtual camera from the plane upon which the map lies). Inside each level, the network is partitioned into bundles that are referred to as tiles. For any given zoom level, the tiles contain various features (attributes) of the road network, for example, which road segments intersect it, where those intersections occur, what are the various features for each of the pieces of the road segments that do intersect any given tile, etc. When the tiles are reassembled, these features too are reassembled. As shown in FIG. 2, different map tiles are sent from map server 220 to client device 230 depending on the zoom level (e.g., height of the virtual camera). In one implementation, the zoom number and the distance from the plane are inversely related.

The attributes of the road segments usually specify real road centerlines to within a few feet or inches of accuracy. This fine level of detail enables users to determine locations and shapes of objects with great accuracy. However, the presence of such diverse data in the tiles creates some challenges that are summarized as follows.

Due to the real world data collection process, each contiguous road is usually partitioned into smaller unique segments (road segments), each containing its own feature data. A large amount of attribute data can be obtained for each road segment. For example, each road segment can contain a large collection of road features, e.g., road class (Interstate Highway, State Highway/Freeway, etc.), labels (e.g., El Camino Real, De Anza Blvd, etc.) in several languages, shields/markers (e.g., I-280, US-101), speed limit, number of lanes, lane widths, road widths, road geometries, etc. Thus, the more road segments in a map tile, the larger would be the size of the data in a map tile. A naïve implementation of storing in a map tile all of the features for each road segment contained within the geographic area spanned by the map tile can create very large map tiles. Some embodiments can judiciously identify the proper data to store in a map tile and organize the data for purposes of compressing the amount of data that is stored within a map tile, while still providing a suitable representation of a view of a map. This can be individually done for each zoom level.

Additionally, roads can have complex geometries. For example, each road segment can encode its geometry (e.g., geometrical location of the segment within the map tile) as an array (sequence) of coordinate points, e.g., latitude and longitude pairs. The more fine-grained the road geometries are, the larger the data size of the resultant map tiles would be. For example, if the locations of the road segment are specified with higher accuracy by having more coordinate points and higher precision (e.g., inches or cm vs. feet or meters), then map tiles using these fine-grained geometries would be quite large. Thus, real world road networks with high resolution road geometries typically provide map tiles that are very large in size. Some embodiments can use the zoom level of the map tiles being created and reduce the precision (e.g., by formulating an approximate road network at a lower precision) in order to make the map tiles of a smaller data size.

The above problems become more pronounced in urban areas. Urban areas typically have a dense network of numerous roads. Since each road segment has its own features and geometries, city road networks typically have tiles with larger data sizes, compared to sparse non-urban areas. Furthermore, most client requests are expected to come from densely populated urban areas, hence large tile sizes are likely to create a serious bottleneck with network throughput between map server 220 and client device 230.

The above problems also become more pronounced at middle levels of zoom, as opposed to very high and very low levels of zoom. For example, the world map data is usually represented in various views (zoom levels). Given a predefined viewport size on the client device, different views cover different geographical areas. A zoomed out view covers a very large area (maybe the entire world) and a zoomed in view typically covers a few blocks in a neighborhood. Each view in a zoom level can be encoded as an arrangement of a collection of map tiles. Different zoom levels represent different degrees of details in the road attributes and geometries. For instance, zoomed-out views may not show local city roads or complex geometries. Zoomed-in views cover a small geographical region; hence though they may represent detailed road network data, the tile sizes are minimal since the geographical area they represent are small (e.g., the number of road segments in the tiles is small). Thus, by filtering out non-relevant information or unnecessary details, tiles of very zoomed-out and zoomed-in views are typically small in size. However, the middle zooms can create a major problem, as they represent a relatively large geographical area (maybe a city, a city and its suburbs or counties). They also contain detailed information of numerous roads (highways as well as local roads) in this area. Hence, tiles in the middle zoom levels are usually significantly larger in size in terms of the amount of data and details they contain.

The above issues can create two issues when road map tiles are displayed on remote client devices. First, the large map tiles transmitted over the network throttles the network throughput. Secondly, rendering of these tiles on the client device may choke a processor of the client device, resulting in jittery real time performance and an unnecessary drain on the valuable battery reserve. However, this high level of detail is often not necessary for the purposes of displaying the network to a human being, since the size of the viewport on the client device is often limited. Combined with the limitations of network throughput and the fact that a coarse view or a sketch of the network is sufficient when viewing the network at macro scale, it is desirable to maintain a coarse view of the network without sacrificing too much accuracy. In such visual applications, a coarse view suffices. Certain embodiments can use this knowledge to significantly reduce the map tile sizes.

III. Compressing Road Features

Embodiments can provide a map server that executes a pipeline that takes as input the roadway network, and after a succession of steps in the pipeline, produces as output a compressed representation of the network appropriate for viewing at a coarse level of resolution, which is appropriate for the given zoom level. As a result, embodiments can address the latency issues described above without compromising end-user visual experience on the device.

Figure 3:
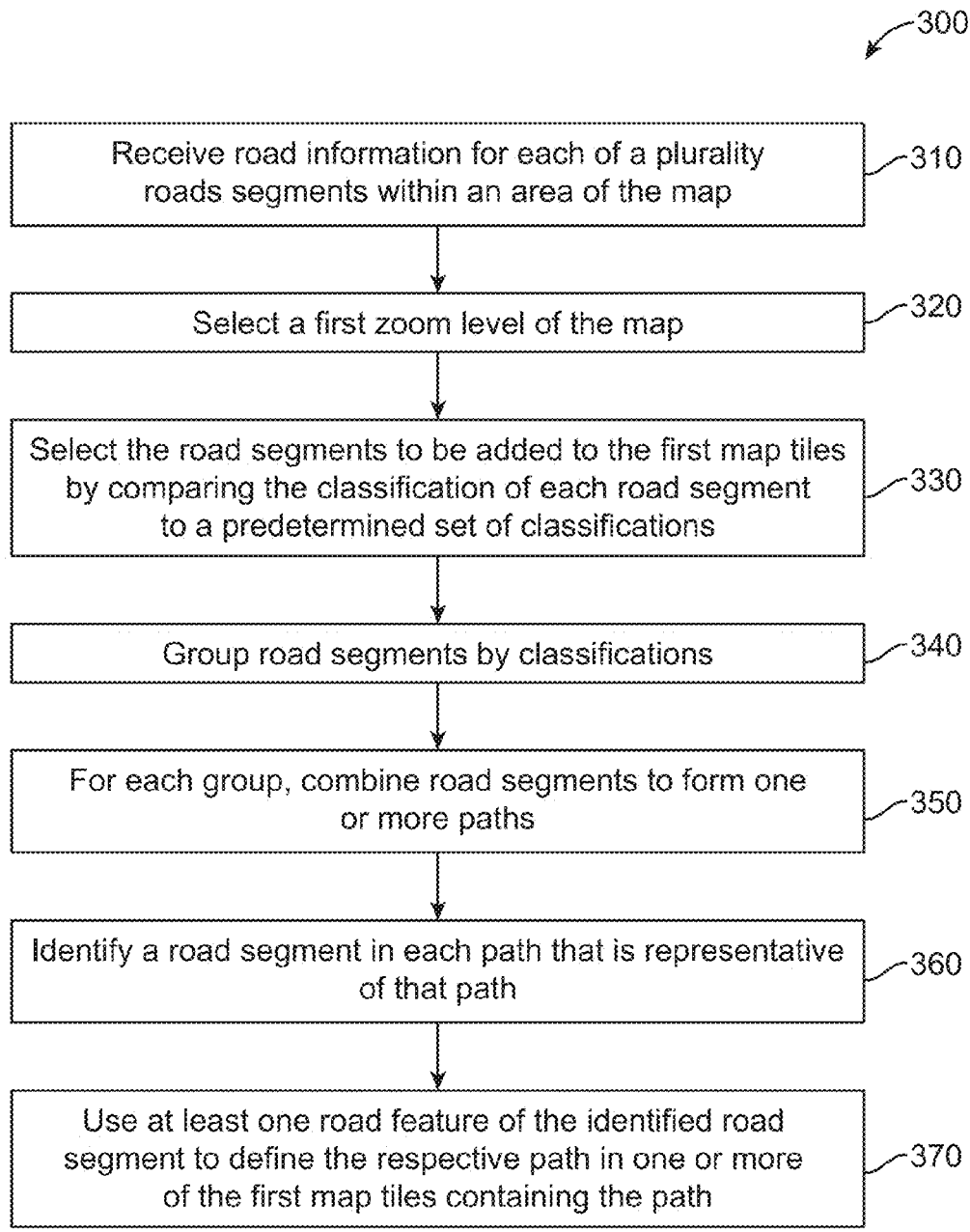
FIG. 3 is a flow chart of a method 300 of compressing road information for map tiles of a map containing a network of roads according to embodiments of the present invention.

FIG. 3 is a flow chart of a method 300 of compressing road information for map tiles of a map containing a network of roads according to embodiments of the present invention. Method 300 may be performed by map server 220 or other map servers described herein. Certain steps are optional, and the order of steps may be occur differently than as presented.

At block 310, road information is received for each of a plurality roads segments of the road network. The road information can include a classification (also called class) and one or more additional road features for each road segment, such as labels (which may be in different languages), shields/markers, speed limit, number of lanes, lane widths, road widths, and road geometries. In one aspect, the plurality of road segments form a graph.

The classifications can provide a hierarchy of the road segments, e.g., in level of importance, lanes, size, etc. Different classification can get rendered differently, e.g., as is described below. Thus, each higher level of classification can be of more importance and can continue to be displayed at a lower zoom level, while display of road segments of lower importance classifications can be stopped once the zoom level drops below a threshold. Each class can have a cutoff of zoom level for when to display the roads of a class.

At block 320, a first zoom level is selected. The map is composed of a plurality of first map tiles for the first zoom level. Other zoom levels may exist, with other sets of map tiles corresponding to each zoom level. The selection of the first zoom level can be based on receiving user input. For example, a user can control the viewable part of the map, and such information can be sent to a server for determining the map tiles. In another example, the selection of a zoom level may be part of an automated computer program running on a server that determines the map tiles for each of a set of zoom levels. In one embodiment, the zoom levels differ by a factor of two between successive zoom levels.

At block 330, the road segments to be added to the first map tiles are optionally selected by comparing the classification of each road segment to a predetermined set of classifications. The road segments having a classification in the predetermined set would be added to the first map tiles. The predetermined set can vary based on the selected zoom level. Thus, each zoom level would have a different set of classifications used to determine whether to add road segments to the map tiles corresponding to the selected zoom level.

The predetermined set of classification for a zoom level can be used to restrict the road data that is displayed at a particular zoom level. For example, road segments with classifications that refer to smaller roads may be excluded for a zoom level below a threshold. The set of classifications may be determined by a processor of the server according to certain criteria or may simply be received as input. In another embodiment, all of the classification may be used, and thus a comparison to a predetermined set is not needed.

When a road class begins to be displayed, not all of the details about the roads in the class need to be displayed. For example, at a onezoom level (e.g., 8), lines indicating the locations of the roads of a road class might begin to be displayed, but the road labels and/or shields may not be displayed until a higher zoom level (e.g., 11 or 12) is reached. Thus, embodiments can specify exactly what details of a road are displayed at each zoom level. Method 300 can be used to determined which details (features) are displayed at a particular zoom level, e.g., which features may be shared across which roads for display to achieve compression.

At block 340, the road segments are grouped according to the classifications. For example, each interstate highway would be put into a same group. Thus, for each classification of a set of classifications (e.g., the predetermined set from block 330), a respective group of road segments having the respective classification can be identified. The road segments of a group would form a subgraph. Since not all of the road segments have the same classification or belong to a same group, the subgraph is smaller than the total graph created by all of the road segments. The subgraph for a group need not be connected. For example, a set of road segments may intersect with each other, but not with another set in the group.

In one embodiment, there is one classification per group. In other embodiments, more than one classification can be placed in a group. For example, neighboring classifications in a hierarchy (e.g., 5 and 6) could be grouped together. This effectively makes a fewer number of classifications, as the raw classifications obtained from a vendor are combined into groups. Thus the determined groups could be coarser than the fine classes obtained from a vendor. The grouping could depend on the zoom level. For instance, two classifications could be grouped to determine the paths at one zoom level, but not grouped at another.

At block 350, for each subgraph, the road segments are combined to form one or more paths. For example, two road segments on either side of an intersection can be combined to be part of a single path. The number of paths would be less than the number of road segments in the respective group as a result of the combining. Typically, a plurality of paths would be formed from each group, particularly when the requested map view is of a city, which would have many road segments in each group. However, there may be scenarios where all of the road segments of one group are combined into a single path.

Each path is a sequence of contiguous road segments. The formation of a path can provide connectivity among the road segments so that road segments are displayed such that they are connected, and not disjoint or separated. For example, intersections are preserved. Connectivity can also be preserved across road classes by preserving intersections between roads of different groups or classes.

In some embodiments, the number of paths for a subgraph is a minimum number of paths needed to cover all of the road segments in a group. For example, junctions having an odd number of road segments can be connected artificially as part of a calculation, and an Eulerian tour of the connected subgraph determined. Then, the artificial connections (also called dummy edges) can be dropped, and the resulting parts of the Eulerian tour correspond to the minimum number of paths for the subgraph.

In one embodiment, certain dummy edges are not dropped. For example, if a dummy edge satisfies one or more criteria, then the dummy edge may be kept, and thus can be part of a path. One criterion can be the length of a dummy edge. In one implementation, the decision of which junctions to join using a dummy edge can be made based on a distance between the junctions, and dummy edges corresponding to junction within a specified distance of each other can be kept, and not removed.

At block 360, for each path, a road segment is identified as being representative of the respective path. The representative segment can be identified as a segment that has features that occur often for the segments in the path. For example, if the most common speed limit for the segments is 35 miles per hour (mph), then a road segment having 35 mph may be used.

In one embodiment, a first attribute can be used as the key for determining the representative segment. The most common value for the first attribute can be determined, and a segment having the most common value can be selected. In one implementation, any segment having the most common value could be chosen. In another implementation, certain criteria could be used (e.g., a second attribute could be used as a key for determining a most common value out of the segments satisfying the criteria for the first attribute). Besides looking at the number of road segments having a particular attribute, embodiments can also look at the length of each road segment and use an attribute that is for a longest part of a path. Thus, a road segment that is longer would be weighted more than a road segment that is shorter.

At block 370, at least one of the additional road features of the identified road segment are used to define the respective path in one or more of the first map tiles containing the path. For example, the representative path chosen in block 360 may have a particular number of lanes. This number of lanes may be used for the entire path as stored in the first map tiles for the first zoom level. Other features used to define the path may correspond to the same representative road segment, or may be obtained from other representative road segments of the path (e.g., each feature could be that of a different road segment). Each path would have a different representative road segment(s), as the sets of road segments in different paths do not intersect (i.e., a road segment is in exactly one path).

As a result of using the at least one additional road feature of the identified road segment for the entire path in which the identified road segment resides, the features of the other road segments do not have to be stored in a map tile. For example, instead of five names, embodiments can store just one name. This sharing of features among road segments can alter the display of a particular road, e.g., different segments of the same path having a different number of lanes can be displayed with a same line thickness. Whereas using the raw data (e.g., an uncompressed map tile), such road segments might get displayed with a different line thickness to illustrate the different number of lanes. However, such differences are relatively minor, and could be removed at higher or lower zoom levels if compression is turned off at a particular zoom level. A path can still be displayed (as long as the path is deemed viewable at the particular zoom level), but the overall bandwidth, storage, and computation costs can be reduced.

In one embodiment, different representative road segments could be chosen for different road features. For example, a particular speed limit could be chosen for a path, where the speed limit corresponds to a first representative road segment of the path. Then, the number of lanes can be chosen, and this number of lanes can correspond to a second representative road segment (i.e., the first representative road segment has a different number of lanes than the second representative road segment). Accordingly, a representative collection of features can be chosen from amongst the constituent segments that comprise a path, where a representative road segment can contribute only one or more than one road feature to the path.

IV. Pipeline

In some embodiments, there are several distinct phases applied in succession, thereby creating a pipeline. Each stage in the pipeline can model a respective problem as an objective to be achieved. Examples of solutions that achieve that objective are provided in subsection below.

In the following description, the road network is expressed as a graph G; the edge set of the graph is the collection of road segments; and the vertex set of the graph is the collection of junctions where road segments terminate or meet. Each edge has an associated sequence of coordinate points that describes the corresponding road (e.g., the centerline of the road).

The following order of routines describes the flow in the pipeline for the function CompressNetwork(G,d) according to embodiments of the present invention. Other orderings of routines are possible.

1: H←SelectSubgraph(G,d)
2: C←ClassifyRoadElements(H)
3: P←FindPathCover(C)
4: F←ExtractFeatures(P,d)
5: S←SparsifyPaths(P,d)

The routine SelectSubgraph(G,d) analyzes the graph G of road segments based on the current set of display parameters d, which can include a current zoom level. The output of SelectSubgraph(G,d) is a subgraph H, which only includes road segments that have a classification appropriate for d (e.g., road segments appropriate for the current zoom level). This routine may correspond to block 330 of method 300. The current set of display parameters d can include: zoom level, tolerances (e.g., error tolerance for sparsification), which classes to group, which road segments to display, which features are extracted, which road feature(s) to use to determine a representative road segment, features to display at a particular zoom level (which may be class dependent), and any other parameters mentioned herein.

The routine ClassifyRoadElements(H) analyzes the subgraph H to classify the road segments in subgraph H. This classification can correspond to block 340 where the road segments are grouped by classification. The road segments could be classified before subgraph H is determined. The output of ClassifyRoadElements(H) is a set C of classified road segments, which can be grouped by classification. As mentioned above, a group can include just one class or more than one class. Thus, the road segments in C can be organized into a plurality of groups.

The routine FindPathCover(C) analyzes the set C independently for each class (group) of road segments. This routine can combine chains of contiguous road segments to form a path, e.g., as described at block 350. The output is a set of paths P, with a subset of one or more paths for each group of the subgraph H.

The routine ExtractFeatures(P,d) determines the features to use for each path in P. The output F of features can correspond to the features identified at block 360 of method 300. These features can be displayed for an entire path based on a representative road segment of the path. A particular feature can be used to determine which road segment is to be used as the representative road segment.

The routine SparsifyPaths(P,d) can approximate the geographic locations of the paths. This approximation can allow a further reduction in size of the map tiles. An error tolerance can be specified for the approximation. The output can be used by a client device receiving the map tiles to determine the position of the paths within the error tolerance.

A. SelectSubgraph(G,d)

In one embodiment, a goal of this routine is to drop all road segments whose associated road class is not appropriate for the current set of display parameters specified by d. For example, if the roadway network is to be displayed from a height of several hundred miles above the surface (e.g., as specified by the height of the virtual camera), then minor class roads can be fully ignored since they will not add any value to the map detail from such a height.

Each road segment can have a tag which describes its road class, and the tag can be readily queried. The road classes to be displayed for a particular zoom level can be specified in a variety of ways. For example, a set of road classes to be displayed could be specified for each zoom level. As another example, road classes that are not included at a zoom level and any lower zooms (i.e. further away) could be specified at the zoom level where the display stops. Conversely, the zoom level where display of a particular road class begins could be specified.

This routine can operate as follows. The subgraph H can be initialized as a null set. Then for each edge (road segment) in the graph G, the tag associated with the road class can be obtained (e.g., queried from a database). It can then be determined whether the queried tag is within an admissible set. The admissible set can be specified as display parameter, noted below as d.admissible_set. If an edge is in the admissible set, then the edge can be added to H.

Figure 4A:
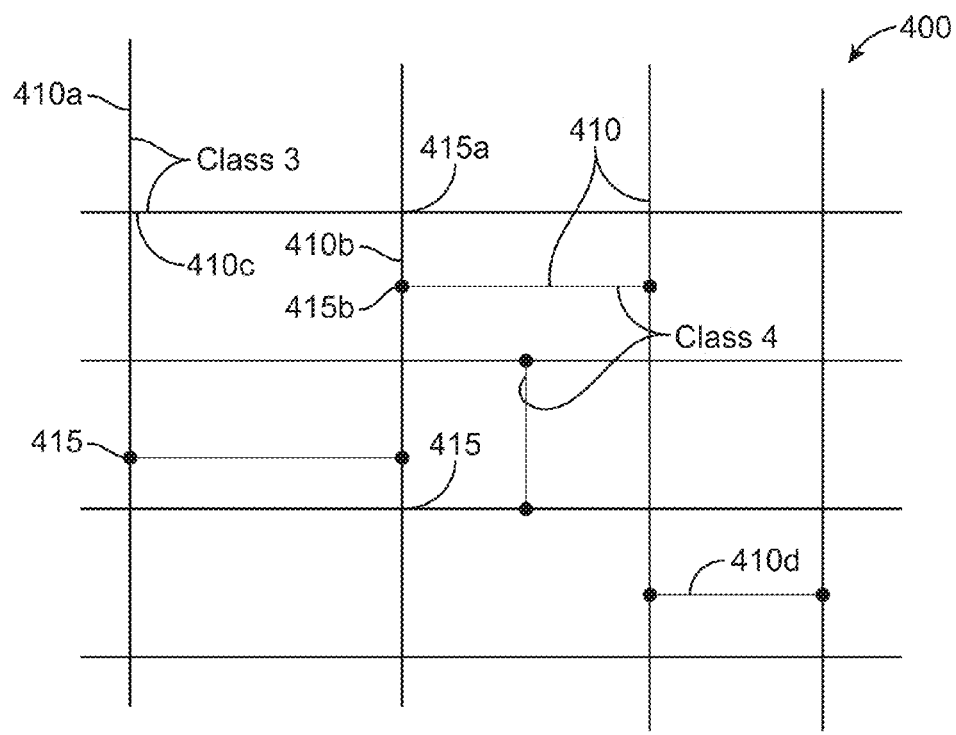
FIG. 4A shows a graph 400 showing road segments 410 with junctions 415.

FIG. 4A shows a graph 400 showing road segments 410 with junctions 415. As shown road segments 410a, 410b, and 410c are of class 3. Junctions 415a are between class 3 segments. Road segment 410d corresponds to class 4. Class 3 road segments would generally be larger roads that class 4 road segments. Junctions 415b are between class 3 segments and the class 4 segments. The classifications could be determined by number, letter, labels, or other characters that have a known relationship. Graph 400 might be displayed at a zoom level that is close enough for the class 4 road segments to be displayed. Note that road segment 410b is between an intersection with class 3 segment 410c and a class 4 segment 410. The class hierarchy can use opposite ordering, where lower classes are of more importance.

Figure 4B:
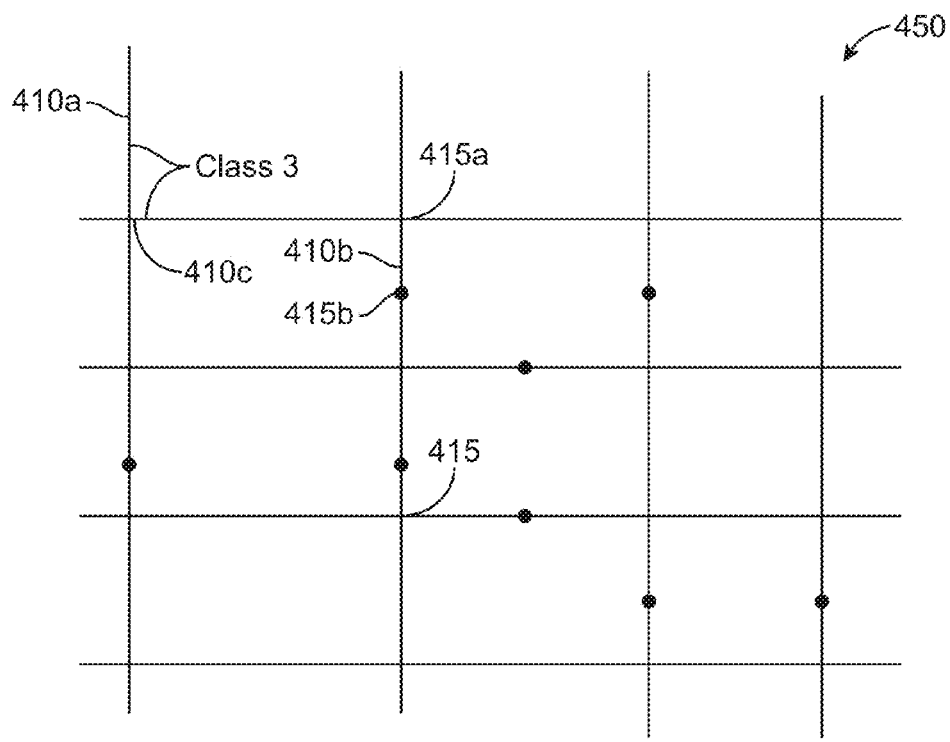
FIG. 4B shows a subgraph 450, where the road segments of class 4 have been removed.

FIG. 4B shows a subgraph 450, where the road segments of class 4 have been removed. The term subgraph is used as not all of the road segments from graph 400 are displayed. For example, the zoom level might be reduced (e.g., such that the virtual camera is further from the map) such that class 4 segments are too small to be displayed, which may be determined at block 330 of method 300. Note that classes higher in order than class 3 can also be included in subgraph 450, but have been excluded for ease of illustration, although it is possible that no class 1 or 2 roads are within the viewable area.

In one embodiment, although class 4 segments are no longer displayed, junctions involving class 4 segments may still be tracked. For instance, class 4 segment 410b is still defined to be between junction 415a and junction 415b. In this manner, junctions can still be faithfully displayed at a proper location, which can help provide connectivity to the graph.

B. ClassifyRoadElements(H)

In one embodiment, the edge set of the subgraph is partitioned into groups of edges (road segments) so that each group of the partition consists of edges of the same class (or at least neighboring classes, e.g., if two consecutive classes are placed into a same group). A purpose of the classification is to discover a large set of connected edges that can be appropriately combined to form a path (e.g., a long chain of connected edges). In this manner, it can become feasible to factor out expensive stylistic attributes associated with the edges, and applied once to large collections of appropriately combined connected edges. As a result, it can become possible to apply the same stylistic features to large appropriately chosen connected edges without sacrificing visual aesthetic and accuracy. Note the edges of a group are not necessarily all connected. Some subgroup of edges of a class may be connected (connected edges of a group may be referred to as a component), but not connected to another subgroup of the same class. A group may have any number of components.

C. FindPathCover(C)

This routine can combine the road segments of a same group into one or more paths.

Each path is typically more than one road segment, but some paths could be a single road segment. Thus, the number of paths is typically smaller than the number of road segments in the subgraph $C_i$ composed of the road segments in the ith group. Note that the subgraph $C_i$ may be composed of more than one connected component.

Figure 5:
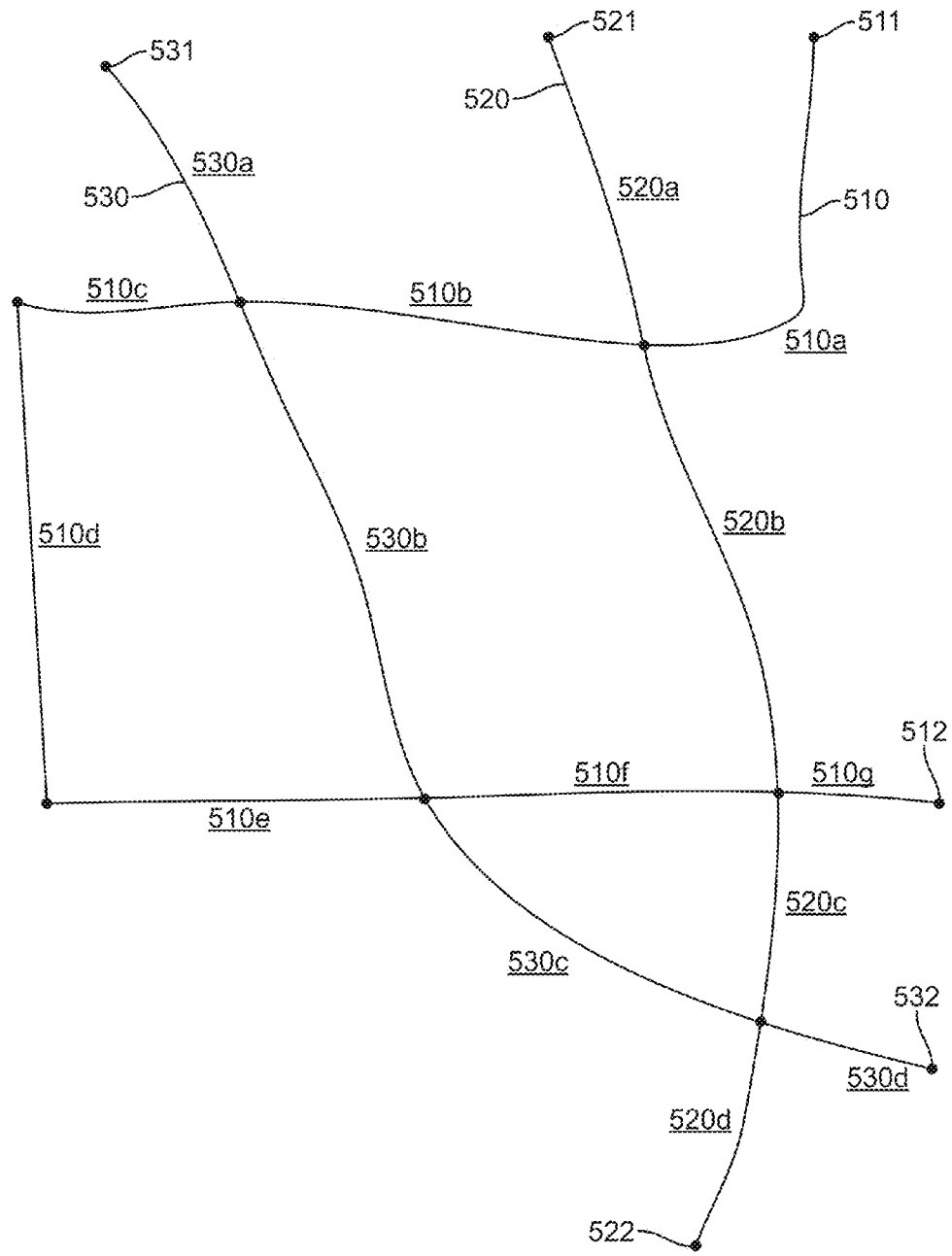
FIG. 5 shows an example set of road segments that are combined into three paths according to embodiments of the present invention.

FIG. 5 shows an example set of road segments that are combined into three paths according to embodiments of the present invention. The three paths are 510, 520, and 530. Path 510 is composed of road segments 510a-510g that lie between junctions, including a starting junction 511 and an ending junction 512. Note that road segments 510c-510e might be received as different road segments at the map server for various reasons, such as having different labels. Path 520 is composed of road segments 520a-520d that lie between junctions, including a starting junction 521 and an ending junction 522. Path 530 is composed of road segments 530a-530d that lie between junctions, including a starting junction 531 and an ending junction 532.

The road segments shown in FIG. 5 compose a connected component as the road segments are all connected. However, subgraph $C_i$ could include other road segments, which may not be connected to any of the road segments shown. One reason this is possible is that these road segments are only of a same group. Although in real life the actual roads generally are connected, the connecting roads may be of a different class, thereby causing one connected component of subgraph $C_i$ to not be connected to another connected component.

The road segments can be combined into paths in various ways, and the number of paths can be reduced or minimized using various techniques and conditions. In some embodiments, the routine receives, as input, a collection of graphs C, where each $C_i \epsilon C$ only contains edges from the same group, and for every i≠j, the edge groups are distinct. In one implementation, this routine can consider each $C_i$ independently of other $C_j$'s and find a minimum-sized (or simply a smaller-sized) cover of the edge set, $E(C_i)$. In other words, the routine can find the minimum number of paths that cover an edge only once, or at least a reduced size relative to the number of road segments in the path.

It is possible that a connected component is a path. However, there may need to be multiple paths for each connected component, depending on the exact geometry of the edges of the connected component (i.e. depending on how the road segments of the same class intersect each other). For example in FIG. 5, it was not possible to cover the connected component with a single path. In one embodiment, the routine can, given a graph/network, cover all edges with a fewest number of edge-disjoint paths in the original graph.

By merging road elements of the same class into a few paths, an embodiment can factor out stylistic attributes so that an entire path can be rendered in the same style as any one of the road segments in the long path with all the road segments strung together. Thus, any long path can retain the features of only one of the road segments contained in the path (e.g., one with the most common features, as described in the next section).

In one embodiment, a method of combining the road segments can proceed as follows via Algorithm 1:

1: P ← ∅
2: for all $C_i$ ∈ C do
3:      Let O be the set of vertices of $C_i$ having odd degree
4:      arbitrarily pair up the element of O and connect them with dummy edges
5:      Add the set of original edges, $E(C_i)$, and the set of dummy edges to a new graph $C_i'$
6:      Find an Eulerian tour, T, of the augmented graph $C_i'$
7:      Delete the dummy edges from T
8:      This gives a cover of $E(C_i)$ by fewest possible paths in a set $P_i$
9:      P ← P ∪ $P_i$
10. return P In FIG. 5, the respective starting junctions 511, 521, and 531 of paths 510, 520, and 530 and the respective ending junctions 512, 522, and 532 of paths 510, 520, and 530 are vertices having an odd degree, and thus would be in O, e.g., as shown in step 3. For step 4, the pairs of odd vertices in O can be paired in a variety of ways. For example, starting junctions 511 and 521 can be paired, ending junctions 512 and 532 can be paired, and starting junction 531 and ending junctions 522 can be paired. As another example, starting junctions 511 and 531 can be paired, ending junctions 512 and 522 can be paired, and starting junction 521 and ending junctions 532 can be paired.

If one inserted road segments between these paired junctions, one obtains the dummy edges referred to above in step 5. The graph of actual and dummy edges can be covered by a single path that only covers each edge once as an Eulerian tour T (e.g., as performed in step 6). In FIG. 5, the Eulerian tour T would include a sequence of consecutive road segments, e.g., starting with segments 510a-510g, a dummy edge from ending junction 512 to starting junction 531, then to segments 530a-530d, a dummy edge from ending junction 532 to starting junction 521, and then to segments 520a-520d, and ending with a dummy edge from ending junction 522 to starting junction 511. This effectively provides a single sequence of road segments. Once the dummy edges are deleted (e.g., in step 7), three sequences of connected edges result, with each sequence corresponding to a path. This set of paths is a minimum number of paths that span the graph $C_i$ shown in FIG. 5, as may be determined in step 8.

In some embodiments, vertices of one connected component can be connected to vertices of other connected components. In other embodiments, odd vertices of a connected component are only connected with each other. In yet another embodiment, a connected component can be used as a single path.

Including Certain Dummy Edges in a Path

As mentioned above, some embodiments can keep certain dummy edges subject to one or more criteria, as opposed to deleting all of the dummy edges, as in Algorithm 1. Thus, not all of the dummy edges might be deleted. The number of dummy edges used in a path can depend on a user-specific parameter. In one embodiment, the user-specified parameter D expresses a distance threshold with respect to the given zoom-level. The routine can be defined as FindPathCover(C, D). In one aspect, the distance threshold D can be chosen such that if the ends of a pair of paths are merged, this merging artifact will not be visually detectable to the user.

A purpose for keeping some dummy edges (labeled strong dummy edges) is to merge more paths together even if the paths are physically disconnected, just so long as the paths are sufficiently close (e.g., less than a threshold distance) so that physically connecting the paths and preserving the connection will not be visually detectable to the end user. This permanent merging of paths will enable factoring out more shared attributes in an attempt to compress the tile sizes without sacrificing too much accuracy or discernible correctness. For example, suppose there are a collection of graphs, C, where each $C_i \epsilon C$ only contains edges from the same class, and for every i≠j, the edge classes are distinct. Embodiments can consider each $C_i$ independently of other $C_j$'s and find a minimum sized cover of the edge set, E(Ci), such that each connected component is a path. A rationale here is that by merging road elements of the same class into few paths, embodiments can factor out costly attributes that can be shared across the constituent road elements, instead of needlessly replicating them, helping to optimize the tile compression ratio.

In one embodiment, a method of combining the road segments can proceed as follows via Algorithm 2:

1: P ← ∅
2: for all $C_i$ ∈ C do
3:      Let O be the set of vertices of $C_i$ having odd degree
4:      For a pair of vertices, u,v ∈ O, let d(u,v) denote the geographic distance between u and v.
5:      Construct an auxiliary graph, G' = (O,E') thus:

```
6:      for all u,v ∈ O do
7:          if d(u,v) ≤ D then
8:              Add edge {u,v} to E'.
9:      for all connected component, Q_j ∈ G' do
10:         Construct a maximum matching, M_j.
11:         Call each edge, e ∈ M_j, "strong dummy edge".
12:     Let O' be the subset of O upon which no edge in any M_j was incident. This is the set of
unmatched vertices still having odd degree.
13: Arbitrarily pair up the elements of O' and connect them with edges. Call each of these a
"weak dummy edge".
14:     Add the set of original edges, E(C_i), and the set of both strong and weak dummy edges to
a new graph C_i'
15:     Find an Eulerian tour, T, of the augmented graph C_i'
16:     Delete the "weak dummy edges" from T while preserving the "strong dummy edges."
17:     This gives us a cover of E(C_i) by a very small number of paths. Call this set P_i.
18:     P ← P ∪ P_i
19. return P
```

Vertices having an odd degree can again be in O, e.g., as shown in step 3. For each pair of vertices, a distance between the vertices can be determined, as in step 4. The separation distance can be defined in various ways, such as a geographic distance between them in two-dimensional coordinates, a distance that includes height as well, and a weighted value, where the weight can be based on similarities/differences between the two segments (e.g., the more road features that are different, the higher the weight) or even the actual pixel separation between these vertices when projected on a client display coordinate space. Then, if two vertices u,v are within a certain distance D (e.g., as specified by a designer of a map application), then an edge {u,v} connecting the two vertices can be added to a set E' for forming an auxiliary graph G', which includes the odd vertices and these added edges. Vertices within the distance D of another vertex (such as u,v) can form a set V.

As a result of this process (e.g., as shown in steps 5-8), a vertex u in O may be part of more than one edge in G', and thus be part of a connected component $Q_j$. To address such a situation, some embodiments can determine a set $M_j$ of edges (e.g., obtained by an application of maximum matching), where edges in $M_j$ are considered strong dummy edges, e.g., as in steps 9-11. In one implementation, if a vertex u is within D of two other vertices in O, then the edge matching the closest vertex is added to $M_j$. For example, if junction 532 (a vertex in O) is within D of junctions 522 and 512, but is closer to junction 512, then only the edge between junctions 532 and 512 would be added to $M_j$ and be labeled a strong dummy edge. If a connected component has only one edge, then that one edge is added to $M_j$.

The vertices upon which no edge in $M_j$ is incident are called unmatched vertices; they make up a set O', e.g., as in step 12. The vertices in O' are paired up, and such edges are week dummy edges, e.g., as in step 13. The original edges (i.e., the edges corresponding to the actual road segments) and the strong and weak dummy edges can be combined into a new graph, $C_i'$. Thus, for a first odd-numbered junction in the set V, an embodiment can determine the one corresponding odd-numbered junction in the set V that has the smallest separation distance with the first odd-numbered junction. And, a dummy edge connects these two odd-numbered junctions in new graph, $C_i'$, and not any other odd-numbered junction with the first odd-numbered junction. An Eulerian tour can be computed (e.g., in step 15), but instead of deleting all dummy edges, only the weak dummy edges are deleted. A fewer number of paths can thus be obtained in Algorithm 2 than in Algorithm 1. In one embodiment, in the limit of D equal to zero, Algorithm 2 is equivalent to Algorithm 1.

D. ExtractFeatures(P,d)

This routine can determine the road segments that are in a particular path, and then determine the features F of each road segment in the path. These road features can be analyzed to determine which road segment should be used as the representative road segment, e.g., as part of block 360.

In one embodiment, this routine receives as input a family of collections of paths, $P_i \in P$. Each collection $P_i$ consists of paths from the same group. For any given path $p \in P_i$, the routine can determine the road segments in the original graph, G, that are in the given path. For example, for a given path, $p \in P_i$, road segments $\{e_1^{(p)}, e_2^{(p)}, \ldots, e_n^{(p)}\}$ are contained in it. Thus, p consists of a sequence of road segments tethered together.

Using rules expressed in the input parameter d (current set of display parameters), the routine can extract a collection of features, for example, road name, labels, etc., which constitute a set of stylistic attributes which can be used for rendering purposes. In one implementation, even though p consists of a sequence of road segments tethered together, at most one of these paths is used as a representative segment that supplies stylistic features. But, all other road segments in the path still contribute to the construction of geometry of p, e.g., the locations of the other road segments are still displayed.

For example, one can tabulate the number of times that a particular feature (key feature) is present for the road segments of a path. As mentioned above, each road segment has a set of features, e.g., speed limit or number of lanes. The number of road segments with various speed limits (e.g, 25, 35, etc.) can be tabulated and the value that appears the most can be used as a key value to select a road segment that is representative of the path. The representative road segment can be selected at random from a subgroup of the road segments having the most common value, or other criteria can be used to select from the road segments having the most common value. A statistical value could also be used, such as a media or average to determine the key value for selecting the representative segment. In such an example, road segments having a value within a threshold of the key value (e.g., within 3 miles if the key feature is speed limit) can be added to a subgroup from which the representative segment is selected. In one aspect, the value that is picked for a given attribute is a function of the collection of values of the road segments for the attribute, as well as possibly other attributes. In one embodiment, the value picked is a dominant value for a feature of the road with respect to the total length where the value appears. For example, if the length of the path is 100 miles, and the value of the 'speed limit' feature is 65 mph for 90 miles, 65 mph can be chosen as the value of the feature of the entire length even though the number of segments that share this value is a small number.

In one embodiment, any of the other road features may be used as a key feature. Just one feature can be used as a key, or many different features. For example, a most common value (or a statistical value such as an average for features where such a value is relevant, e.g., speed limit) for each of a plurality of road features can be used as a multi-dimensional point. The road segment with the closest distance to this multi-dimensional point could be chosen as being the representative road segment. If several road segments have the same distance, then other criteria can be used for selecting the representative segment from the several road segments having the same distance. Alternatively, a segment may be randomly chosen from the several road segments having the same distance.

E. SparsifyPaths(P,d)

Each road segment has a corresponding number of points that specify where the road segment lies on the map. These points may lie at fixed distances, e.g., every 100 feet, and be part of the extracted road features. The points may be specified with a latitude and longitude, or some other two-dimensional grid. This routine can reduce the number of points stored for each road segment, thereby reducing the storage requirements for a segment. The resulting points may be a reduced set of the original points, or may be a different set of fewer points (i.e. fewer than the original points), which lie close to the original road segment.

In one embodiment, this routine also receives as input a family P of collection of paths, $P_i \in P$, where each collection $P_i$ consists of paths from the same group. This routine can sparsify the paths contained in each collection, e.g., with respect to a sparsification parameter for that group. The sparsification parameter (e.g., an error tolerance) may be specified in the current set d of display parameters.

A variety of algorithms can be used to reduce the storage requirements of a particular path, while maintaining a specific error tolerance. For example, a function can be used to approximate a path or part of a path. The function can be defined with a number of parameters that are less than the number of points of a segment. For instance, polynomials (such as splines) could be used. In other embodiments, the number of points is reduced by dropping points, and potentially adding new points that provide an estimate of the path with few points. Thus, a result is that a path is described using less values and simpler descriptive complexity without deviating substantially from the original path.

In one implementation, for the purposes of sparsification, the Douglas-Peucker algorithm is employed in the following method:

```
1: S ← ∅
2: for all P_i ∈ P do
3:     ε_i ← d.epsilon[i]
4:     P_i' ← ∅
5:     for all paths p ∈ P_i do
6:         p' ← Douglas_Peucker(p, ε_i)
7:         P_i' ← P_i' ∪ p'
8:     S ← S ∪ P_i'
9. return S
```

The error tolerance is specified as $\epsilon_i$ and can be obtained as a value from the display parameters. The error tolerance can be different for each group. Typically, the paths in a group would have a same error tolerance. The error tolerance $\epsilon_i$ and a path p (specifically the points in the path) are used to find a path p', which has a reduced number of points. As shown, the Douglas-Peucker algorithm, is used to determine which points to remove from the original set of points defining the location of path p to obtain p'. This removal of points can reduce storage of the path and bandwidth for transmitting the path. The output is a family S of collections $P_i'$ of paths. The number of paths in S is the same as in P, but each path will typically have fewer points.

In one example, the sparsification parameter is a measure of desired accuracy for the positions (e.g., shape) of the paths. The value of d.epsilon can specify the accuracy for the positions of the paths in the map tiles, and thus the accuracy of the roads as they are displayed on the view of the map. The Douglas-Peucker algorithm reduces the number of points on a curve, while maintaining the curve within a specified tolerance of the original curve. In this manner, the number of points to draw a path is reduced, which in turn reduces the storage size of the map tile. In one embodiment, the value of d.epsilon is a function of the zoom level, and the range of d.epsilon can be measured in pixels. For low zooms, the threshold (d.epsilon) would be a higher number of pixels than the higher zooms where visual clarity is more important.

One embodiment constrains the removal of points of a path such that the junctions are always kept. As the junctions are kept, a connectivity in the display of the road segments can be kept. In one implementation, different road segments of a path are analyzed independently. For example, a road segment can be fed into the Douglas-Peucker algorithm with the constraint that the end points are not removed. Since the end points are kept, each road segment can be analyzed in parallel, with the number of points removed being based on only the points of the road segment being analyzed.

Figure 6A:
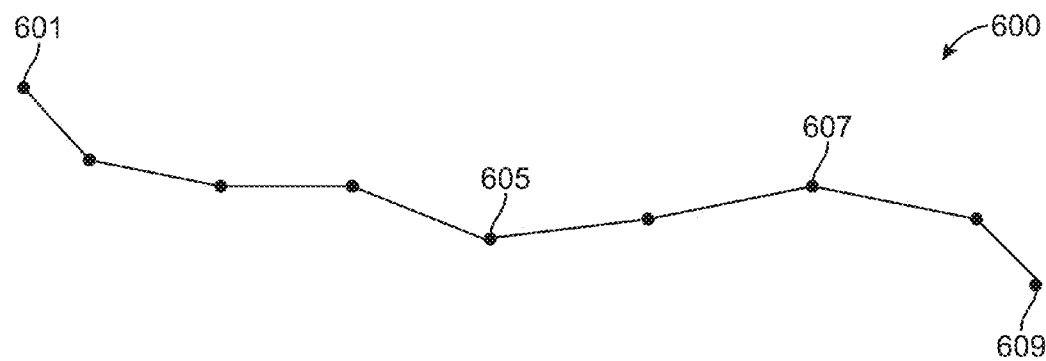
FIG. 6A shows an example of a road segment 600 defined by nine points.

FIG. 6A shows an example of a road segment 600 defined by nine points. In this example, point 601 is the starting junction and point 609 is the ending junction of the road segment. In other embodiments, more than one road segment can be analyzed at once. Generally, a road segment would be defined by more points, but only nine are chosen for ease of presentation.

Figure 6B:
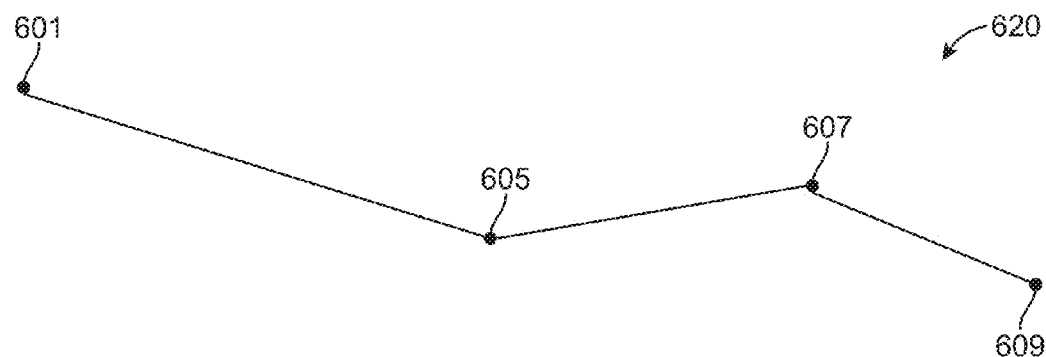
FIG. 6B shows a sparsified road segment 620 where certain points are removed from the original set of points.

FIG. 6B shows a sparsified road segment 620 where certain points are removed from the original set of points. Points 605 and 607 are kept, along with the starting junction 601 and the ending junction 609. The resulting path has fewer points. This is purely an example to illustrate the technique and not necessarily a demonstration of how an embodiment using the Douglas-Peucker algorithm would perform. The removal of certain original points can be constrained by the error tolerance, e.g., such that a line connecting the points does not deviate from the original path by more than the error tolerance. The original points could also be moved within a certain error tolerance (e.g., a point could be moved within a predetermined circle around the original point).

Figure 6C:
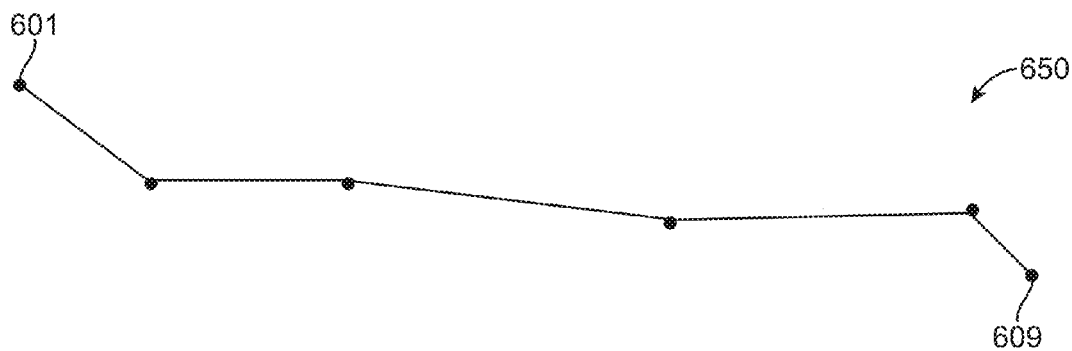
FIG. 6C shows an example of a sparsified road segment 650 that approximates path 600 using six point where some points are not the original points.

FIG. 6C shows an example of a sparsified road segment 650 that approximates path 600 using six point where some points are not the original points. In this example, starting junction 601 and ending junction 609 are kept, but the other four points do not correspond to any of the original points. The reduction in the number of points is dependent on d.epsilon and can be dependent on the geometry of the specific path.

V. Results

Embodiments can provide significant savings in terms of storage size (and transmission size) of map tiles used to express features and geometries. The reduced size map tiles can appear indistinguishable to the unaided eye. In some embodiments, the savings have been on the order of roughly 90% in the case of a view that tightly captures the San Francisco area (e.g., the number of point features decreased from 100,000 to 10,000).

Figure 7:
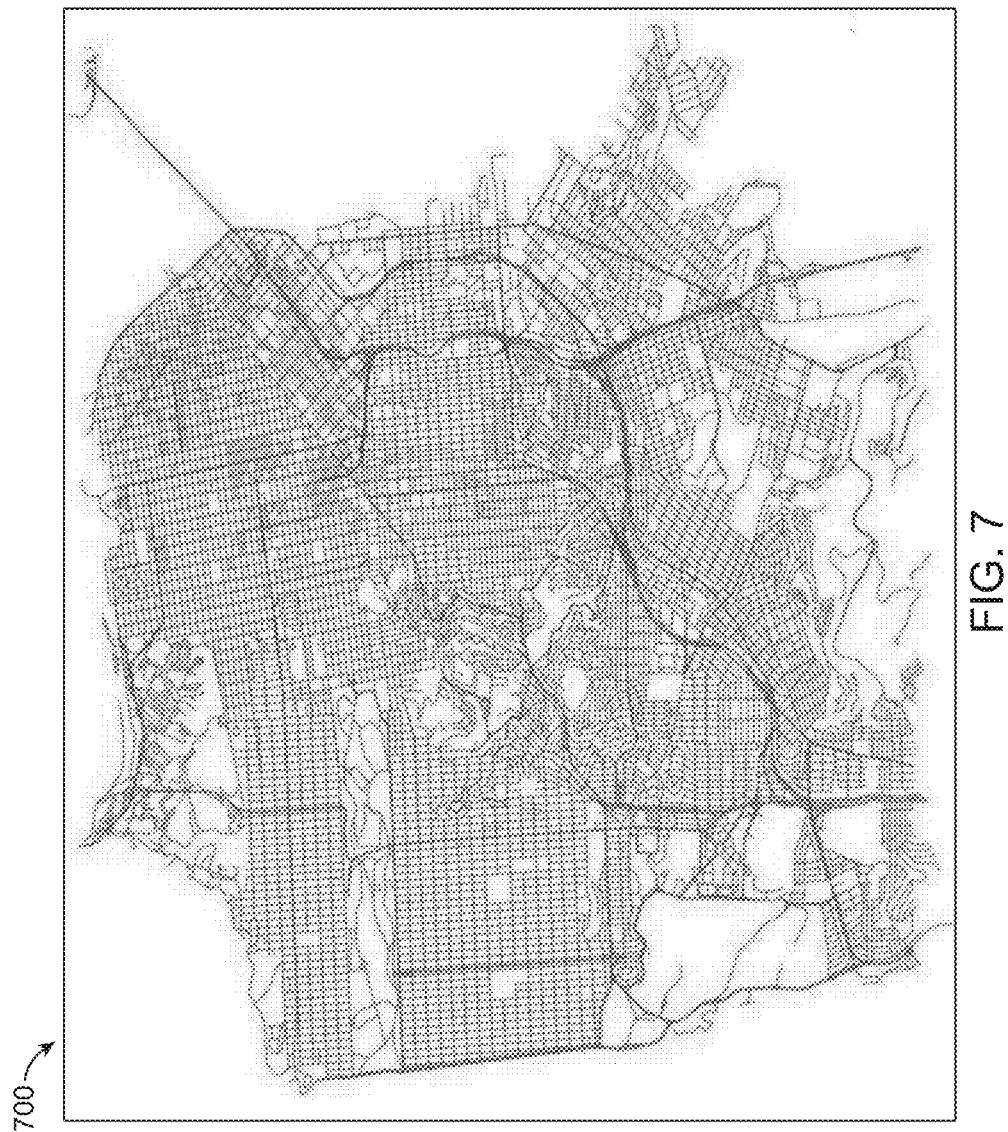
FIG. 7 shows a view 700 of the San Francisco roadway network before using an embodiment of the present invention.

FIG. 7 shows a view 700 of the San Francisco roadway network before using an embodiment of the present invention. About 90,000 points are used to show a location of each road, i.e. of every class. In addition to the number of points, data related to the width of each road segment is used to display view 700.

Figure 8:
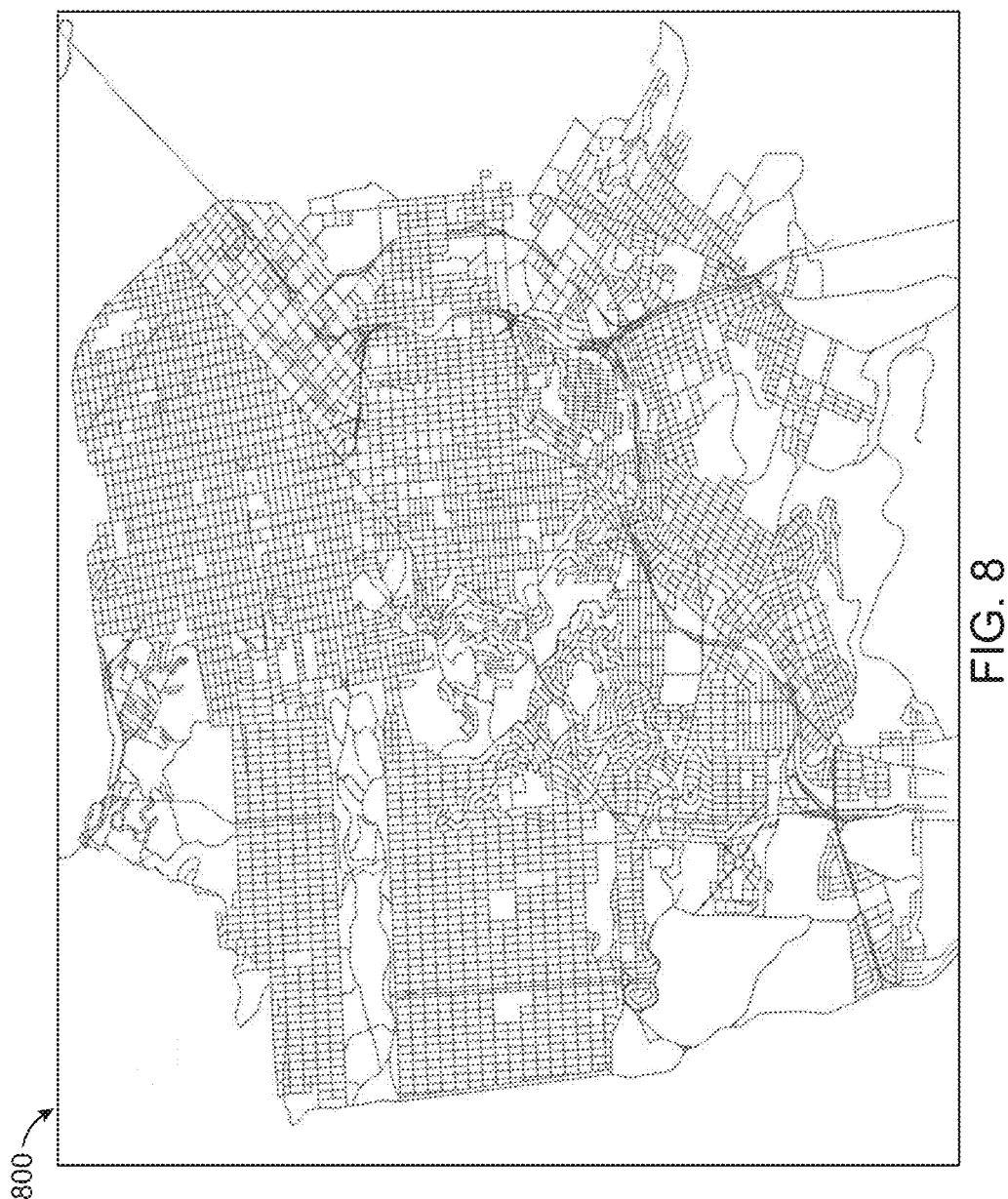
FIG. 8 shows a view 800 of the San Francisco roadway network after using an embodiment of present invention.

FIG. 8 shows a view 800 of the San Francisco roadway network after using an embodiment of present invention. There is little visual difference between view 700 and view 800. For example, certain small roads are not displayed (e.g., as specified by a particular set of classes), but such roads typically are not needed at this selected zoom. A differentiation of a width of some roads by a thickness is lost, but distinctions between freeways is kept, along with certain major roads. Also, the locations of the roads appear to be identical. The load time and the refresh rates on the client device improves considerably because of the decrease in tile size.

Accordingly, embodiments are provided for reducing a storage size of map tiles used to create view of a road network on a map. Techniques can minimize data in a roadway network without discarding relevant feature information or sacrificing too much visual accuracy when the network is viewed from afar. This data reduction is amenable to transmission over the network to remote devices, serving the needs of the end-users who wish to visualize the network without unnecessarily causing network latencies. The data reduction can also help the client device to efficiently render the roadway vector data in near real-time.

VI. Mobile Device and Server

FIG. 9A is a simplified block diagram of an implementation of a device 900 according to an embodiment of the present invention. Device 900 can be a mobile device, a handheld device, a notebook computer, a desktop computer, or any suitable electronic device with a screen for displaying images and that is capable of communicating with a map server 950 as described herein. Device 900 includes a processing subsystem 902, a storage subsystem 904, a user input device 906, a user output device 908, a network interface 910, and a location/motion detector 912.

Processing subsystem 902, which can be implemented as one or more integrated circuits (e.g., e.g., one or more single-core or multi-core microprocessors or microcontrollers), can control the operation of device 900. In various embodiments, processing subsystem 902 can execute a variety of programs in response to program code and can maintain multiple concurrently executing programs or processes. At any given time, some or all of the program code to be executed can be resident in processing subsystem 902 and/or in storage subsystem 904.

Through suitable programming, processing subsystem 902 can provide various functionality for device 900. For example, processing subsystem 902 can execute a map application program (or "app") 916. Map app 916 can perform all or parts of methods described herein, such as determining which map tiles to retrieve based on a position of a virtual camera. Map app 916 can use tile locations 917 to determine which tiles to request and/or where retrieved tiles should be placed, e.g., based on an index.

Storage subsystem 904 can be implemented, e.g., using disk, flash memory, or any other storage media in any combination, and can include volatile and/or non-volatile storage as desired. In some embodiments, storage subsystem 904 can store one or more application programs to be executed by processing subsystem 902 (e.g., map app 916). In some embodiments, storage subsystem 904 can store other data (e.g., used by and/or defined by map app 916). Programs and/or data can be stored in non-volatile storage and copied in whole or in part to volatile working memory during program execution.

A user interface can be provided by one or more user input devices 906 and one or more user output devices 908. User input devices 906 can include a touch pad, touch screen, scroll wheel, click wheel, dial, button, switch, keypad, microphone, or the like. User output devices 908 can include a video screen, indicator lights, speakers, headphone jacks, or the like, together with supporting electronics (e.g., digital-to-analog or analog-to-digital converters, signal processors, or the like). A customer can operate input devices 906 to invoke the functionality of device 900 and can view and/or hear output from device 900 via output devices 908.

Network interface 910 can provide voice and/or data communication capability for device 900. For example, network interface 910 can provide device 900 with the capability of communicating with map server 950. In some embodiments network interface 910 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 910 can provide wired network connectivity (e.g., Ethernet) in addition to or instead of a wireless interface. Network interface 910 can be implemented using a combination of hardware (e.g., antennas, modulators/demodulators, encoders/decoders, and other analog and/or digital signal processing circuits) and software components.

Location/motion detector 912 can detect a past, current or future location of device 900 and/or a past, current or future motion of device 900. For example, location/motion detector 912 can detect a velocity or acceleration of mobile electronic device 900. Location/motion detector 912 can comprise a Global Positioning Satellite (GPS) receiver and/or an accelerometer. In some instances, processing subsystem 902 determines a motion characteristic of device 900 (e.g., velocity) based on data collected by location/motion detector 912. For example, a velocity can be estimated by determining a distance between two detected locations and dividing the distance by a time difference between the detections.

FIG. 9B is a simplified block diagram of an implementation of map server 950 according to an embodiment of the present invention. Map server 950 may be used for any map server mentioned herein. Map server 950 includes a processing subsystem 952, storage subsystem 954, a user input device 956, a user output device 958, and a network interface 960. Network interface 960 can have similar or identical features as network interface 910 of device 900 described above.

Processing subsystem 952, which can be implemented as one or more integrated circuits (e.g., a conventional microprocessor or microcontroller), can control the operation of map server 950. In various embodiments, processing subsystem 952 can execute a variety of programs in response to program code and can maintain multiple concurrently executing programs or processes. At any given time, some or all of the program code to be executed can be resident in processing subsystem 952 and/or in storage subsystem 954.

Through suitable programming, processing subsystem 952 can provide various functionality for map server 950. Thus, map server 950 can interact with map app 916 being executed on device 900 in order to provide map tiles to device 900. In one embodiment, map server 950 stores the map tiles 966, and sends them based on a request for a particular index, as identified by tile index 968. The map tiles can be stored in a location pointed to by the tile index 958 for quick retrieval. A compression module 964 can perform methods as described herein to compress road information for the roads of a network and determine the data to be stored in the map tiles 966.

Storage subsystem 954 can be implemented, e.g., using disk, flash memory, or any other storage media in any combination, and can include volatile and/or non-volatile storage as desired. In some embodiments, storage subsystem 954 can store one or more application programs to be executed by processing subsystem 952. In some embodiments, storage subsystem 954 can store other data, such as map tiles 966 and tile index 968 (used to identify specific tiles). Programs and/or data can be stored in non-volatile storage and copied in whole or in part to volatile working memory during program execution.

A user interface can be provided by one or more user input devices 956 and one or more user output devices 958. User input and output devices 956 and 958 can be similar or identical to user input and output devices 906 and 908 of device 900 described above. In some instances, user input and output devices 956 and 958 are configured to allow a programmer to interact with map server 950. In some instances, map server 950 can be implemented at a server farm, and the user interface need not be local to the servers.

It will be appreciated that device 900 and map server 950 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 900 and/or multiple map servers 950, different devices 900 and/or map servers 950 can have different sets of capabilities; the various devices 900 and/or map servers 950 can be but need not be similar or identical to each other.

Further, while device 900 and map server 950 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 900 and map server 950 are described as singular entities, it is to be understood that each can include multiple coupled entities. For example, map server 950 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of compressing road information for map tiles of a map containing a network of roads, the method comprising:
   receiving road information for each of a plurality of road segments of the road network, each road segment having a classification and one or more additional road features, the plurality of road segments forming a graph;
   selecting a first zoom level of the map, the map being composed of a plurality of first map tiles for the first zoom level;
   identifying, with a computer system, a plurality of groups of road segments based on the classifications of the road segments, wherein each group of road segments forms a subgraph;
   for each of the groups:
      combining, with the computer system, the road segments of the respective group to form one or more paths, wherein the number of paths is less than the number of road segments in the respective group; and
   for each path:
      identifying, with the computer system, a road segment in the path that is representative of the respective path; and
      using at least one of the additional road features of the identified road segment to define the respective path in one or more of the first map tiles containing the path.

2. The method of claim 1, wherein a first group of road segments are combined to form a plurality of paths, and wherein combining the road segments of the first group to the plurality of paths includes:
   connecting odd-numbered junctions of a first subgraph corresponding to the first group using dummy edges to form an augmented subgraph;
   determining an Eulerian tour of the augmented subgraph;
   removing one or more of the dummy edges from the Eulerian tour to form separated sections of the Eulerian tour; and
   using the separated sections of the Eulerian tour as the plurality of paths for the first group.

3. The method of claim 2, wherein connecting odd-numbered junctions includes:
   identifying a set of one or more pairs of odd-numbered junctions, wherein the two odd-numbered junctions of a pair of the set have a separation distance that is within a specified distance, and wherein removing one or more of the dummy edges includes:
      removing dummy edges that do not correspond to the one or more pairs of odd-numbered junctions in the set.

4. The method of claim 3, wherein connecting odd-numbered junctions further includes:
   for a first odd-numbered junction in the set:
      determining one corresponding odd-numbered junction in the set that has the smallest separation distance with the first odd-numbered junction; and
      connect the first odd-numbered junction only to the one corresponding odd-numbered junction using a dummy edge.

5. The method of claim 1, wherein the road information includes a plurality of road positions for the road segments of a first path, the method further comprising:
   identifying an error tolerance for displaying road positions of a first path at the first zoom level;
   computing an approximation to the first path based on the error tolerance; and
   using the approximation to define the path in one or more of the first map tiles containing the path.

6. The method of claim 5, wherein the approximation removes road positions from the plurality of road positions.

7. The method of claim 6, wherein computing the approximation uses the Douglas-Peucker algorithm.

8. The method of claim 1, wherein identifying a road segment in a first path that is representative of the first path includes:
   identifying a key road feature from the one or more additional road features;
   determining a key value for the key road feature in the road segments of the first path;
   identifying a first subgroup of the road segment of the first path that have the key value or have a value within a specified threshold of the key value; and
   identifying one of the road segments of the first subgroup as being representative of the first path.

9. The method of claim 8, wherein the key value is a value that occurs most often in the road segments of the first path.

10. The method of claim 8, wherein the key value is a statistical value of the values of the road segments.

11. The method of claim 8, further comprising:
    using a plurality of key road features, each having a respective key value;
    determining a multi-dimensional key value composed of each of the respective key values;
    for each road segment of the first path:
       defining a respective multi-dimensional point based on the values of the key road features of the respective road segment; and
       determining a distance between the respective multi-dimensional point and the multi-dimensional key value; and
    identifying a road segment closest to the multi-dimensional key value based on the respective distances as being representative of the first path.

12. The method of claim 1, wherein each group of road segments corresponds to road segments having a same classification.

13. The method of claim 1, wherein identifying a plurality of groups of road segments based on the classifications of the road segments includes:
    identifying a predetermined set of classifications, each one of the predetermined classifications assigned to a particular group, wherein a road segment not having a classification in the predetermined set is not used to define the first map tiles; and
    for each group:
       selecting road segments having a classification assigned to the respective group to form the subgraph corresponding to the respective group.

14. The method of claim 13, wherein the predetermined set of classifications depends on the selected zoom level.

15. The method of claim 1, wherein the at least one additional road feature of the identified road segment used to define the respective path in the one or more of the first map tiles containing the path is dependent on the selected zoom level.

16. The method of claim 1, further comprising:
    receiving, at the computer system, a request from a mobile device for one or more map tiles at the first zoom level; and
    sending one or more of the first map tiles to the mobile device.

17. The method of claim 16, further comprising:
using the received map tiles to render, with a processor of the mobile device, an image of a portion of the map.

18. The method of claim 1, wherein each path has a plurality of road segments.

19. The method of claim 1, wherein selecting a first zoom level of the map is based on user input.

20. A computer product comprising a non-transitory computer readable medium storing a plurality of instructions that when executed control a computer system to compress road information for map tiles of a map containing a network of roads, the instructions comprising:
receiving road information for each of a plurality road segments of the road network, each road segment having a classification and one or more additional road features, the plurality of road segments forming a graph;
selecting a first zoom level of the map, the map being composed of a plurality of first map tiles for the first zoom level;
identifying a plurality of groups of road segments based on the classifications of the road segments, wherein each group of road segments forms a subgraph;
for each of the groups:
combining the road segments of the respective group to form one or more paths, wherein the number of paths is less than the number of road segments in the respective group; and
for each path:
identifying a road segment in the path that is representative of the respective path; and
using at least one of the additional road features of the identified road segment to define the respective path in one or more of the first map tiles containing the path.

21. The computer product of claim 20, wherein a first group of road segments are combined to form a plurality of paths, and wherein combining the road segments of the first group to the plurality of paths includes:
connecting odd-numbered junctions of a first subgraph corresponding to the first group using dummy edges to form an augmented subgraph;
determining an Eulerian tour of the augmented subgraph;
removing one or more of the dummy edges from the Eulerian tour to form separated sections of the Eulerian tour; and
using the separated sections of the Eulerian tour as the plurality of paths for the first group.

22. The computer product of claim 20, wherein the road information includes a plurality of road positions for the road segments of a first path, the instructions further comprising:
identifying an error tolerance for displaying road positions of a first path at the first zoom level;
computing an approximation to the first path based on the error tolerance; and
using the approximation to define the path in one or more of the first map tiles containing the path.

23. The computer product of claim 20, wherein identifying a road segment in a first path that is representative of the first path includes:
identifying a key road feature from the one or more additional road features;
determining a key value for the key road feature in the road segments of the first path;
identifying a first subgroup of the road segment of the first path that have the key value or have a value within a specified threshold of the key value; and
identifying one of the road segments of the first subgroup as being representative of the first path.

24. A system comprising:
one or more processors configured to compress road information for map tiles of a map containing a network of roads by:
receiving road information for each of a plurality road segments of the road network, each road segment having a classification and one or more additional road features, the plurality of road segments forming a graph;
selecting a first zoom level of the map, the map being composed of a plurality of first map tiles for the first zoom level;
identifying a plurality of groups of road segments based on the classifications of the road segments, wherein each group of road segments forms a subgraph;
for each of the groups:
combining the road segments of the respective group to form one or more paths, wherein the number of paths is less than the number of road segments in the respective group; and
for each path:
identifying a road segment in the path that is representative of the respective path; and
using at least one of the additional road features of the identified road segment to define the respective path in one or more of the first map tiles containing the path.

25. The system of claim 24, wherein a first group of road segments are combined to form a plurality of paths, and wherein combining the road segments of the first group to the plurality of paths includes:
connecting odd-numbered junctions of a first subgraph corresponding to the first group using dummy edges to form an augmented subgraph;
determining an Eulerian tour of the augmented subgraph;
removing one or more of the dummy edges from the Eulerian tour to form separated sections of the Eulerian tour; and
using the separated sections of the Eulerian tour as the plurality of paths for the first group.

26. The system of claim 24, wherein the road information includes a plurality of road positions for the road segments of a first path, wherein the one or more processors are further configured to:
identify an error tolerance for displaying road positions of a first path at the first zoom level;
compute an approximation to the first path based on the error tolerance; and
use the approximation to define the path in one or more of the first map tiles containing the path.

27. The system of claim 24, wherein identifying a road segment in a first path that is representative of the first path includes:
identifying a key road feature from the one or more additional road features;
determining a key value for the key road feature in the road segments of the first path;
identifying a first subgroup of the road segment of the first path that have the key value or have a value within a specified threshold of the key value; and
identifying one of the road segments of the first subgroup as being representative of the first path.

* * * * *